June 24, 1930.  E. ROBERTS  1,768,492
MOUNT FOR CENTRIFUGAL MACHINES
Filed May 23, 1925  2 Sheets-Sheet 2
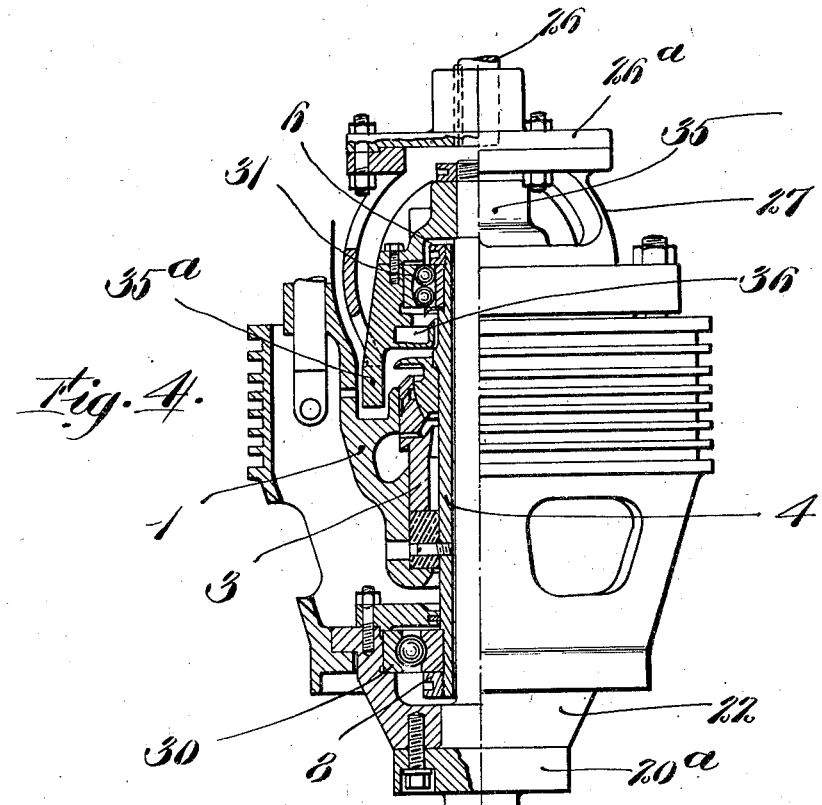
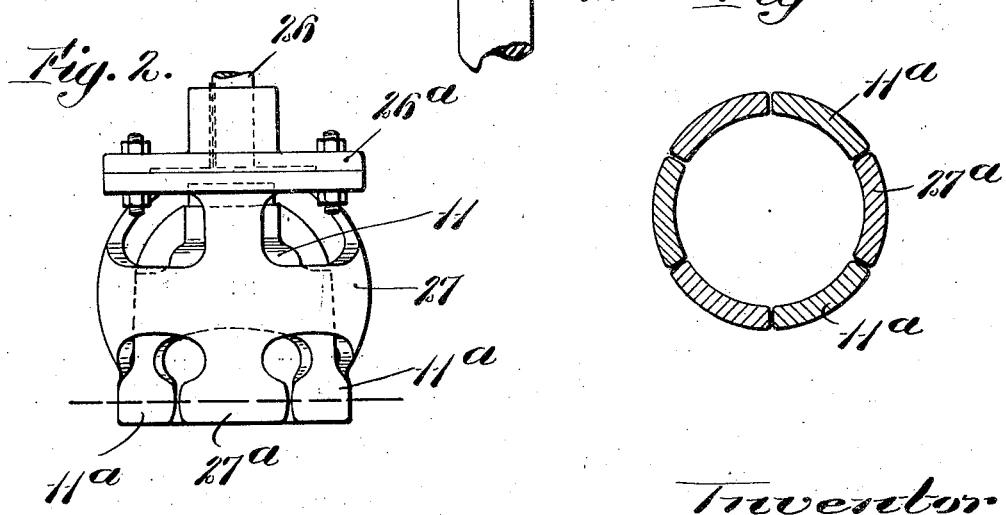
Inventor
Eugene Roberts
by Geo. N. Goddard atty.

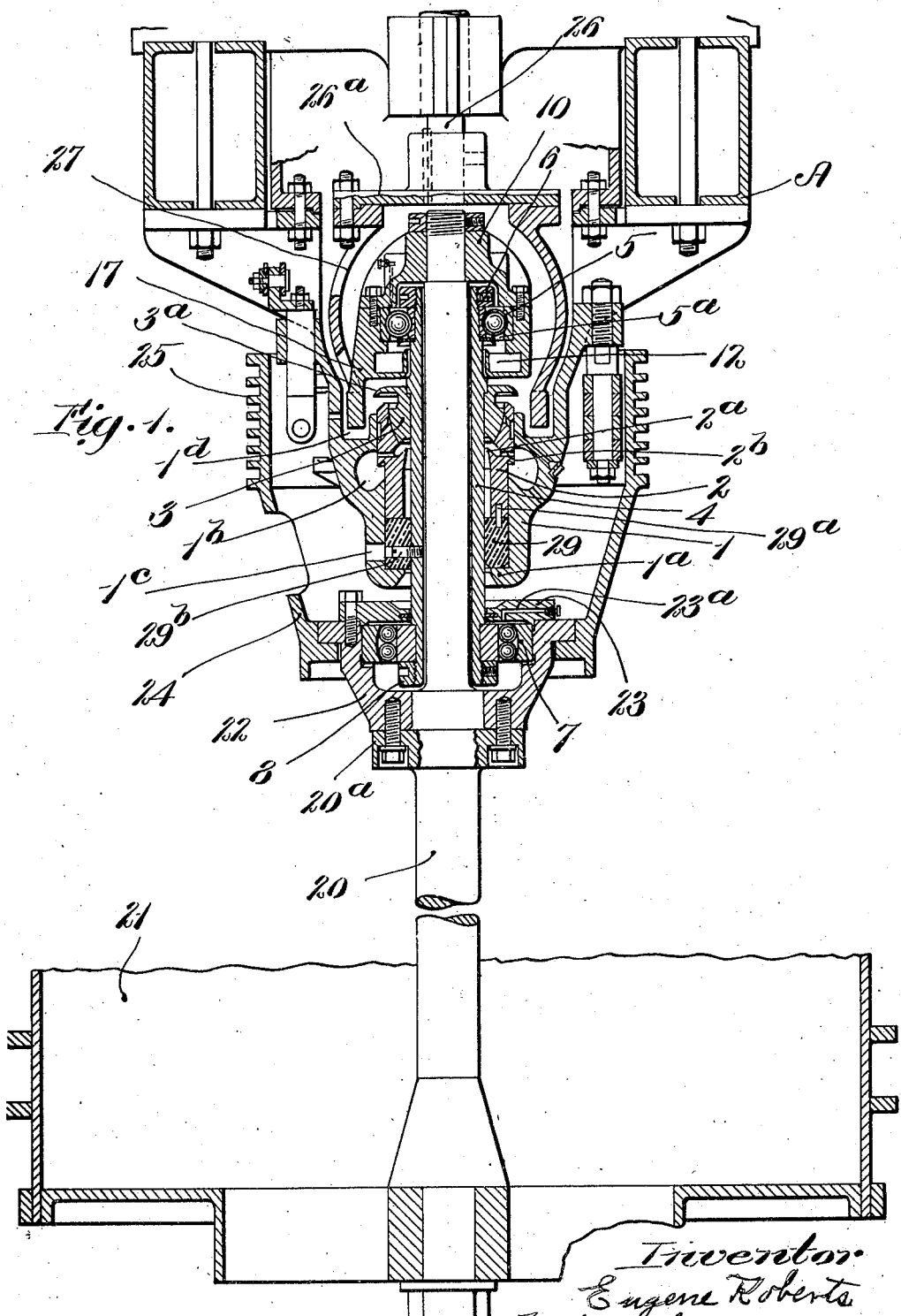

Patented June 24, 1930

1,768,492

UNITED STATES PATENT OFFICE

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH

MOUNT FOR CENTRIFUGAL MACHINES

Application filed May 23, 1925. Serial No. 32,507.

This invention relates to centrifugal machines of the gyratory type, and is intended to improve the construction by which suspended centrifugals of the gyratory type are rotatably supported. Among the features characterizing the present invention is the arrangement of the yielding centralizing buffer below the center of gyration under an arrangement that permits the use of a ball and socket suspension joint while utilizing the weight of the machine to compress the underneath buffer into tight-gripping engagement, with a non-rotating gyratory suspending element, so as to prevent the lifting of the suspending element from its spherically curved supporting seat under the strains produced by the lateral swinging of the rotating machine.

Another feature characterizing the invention is the construction and arrangement by which the centrifugal is rotatably supported by upper and lower anti-friction bearing elements on opposite sides of the center of gyration, and is driven by a positive flexibly connected coupling from an overhead non-gyratory shaft. These and other features of the invention will be particularly described in the following specification and will be defined in the claims hereto annexed.

In the accompanying drawings I have illustrated two forms of construction and arrangement embodying the principles of this invention, in which:
Figure 1 is an elevation in central section showing the suspension and driving parts by which the basket is operatively supported for rotation and gyration.

Figure 2 is a detail view showing the positive driving coupling in elevation.

Figure 3 is a cross sectional view thereof on the plane indicated by the broken line of cross Figure 2.

Figure 4 shows partly in elevation and partly in central section a slightly modified arrangement in which the axial thrust is supported by the lower bearing element instead of by the upper bearing element, as in Figure 1, this form in other respects being essentially the same as that shown in Figure 1.

Machines of this overhead suspension gyratory type, having a ball and socket supporting joint, were commonly supplied with a yielding centralizing buffer interposed between the upwardly projecting end of the suspender element and the surrounding hanger or casing, and this arrangement, because the swaying of the machine tended to lift the ball from its socket or seat, was apt to produce vibration, heating of bearing and other troubles in the operation of such machines.

The present invention deals with this problem by arranging the yielding centralizing buffer below the ball and socket suspension joint and so arranged that the weight of the machine tends to compress the buffer into tight gripping engagement with the adjacent portion of the gyratory suspending element, which results in overcoming or preventing the tendency of the violently swaying centrifugal to pound or hammer on its supporting seat.

In practice I provide a fixed hanger 1, which is bolted to the overhead frame-work A alongside of the mixer, and which is provided at its bottom with an inwardly turned shoulder or ledge 1ª forming a support for the annular elastic buffer 29 which supports a non-gyratory but vertically movable socket element 2. The upper end of this socket element is formed with a cup-like spherically curved cavity or seat for the reception of a correspondingly curved ball member 3, which surrounds and is integrally secured to the tubular member 4 of the suspender to which are attached the anti-friction bearing elements.

In this case the upper ball-bearing element 5 is clamped by a clamping ring 6 against an annular shoulder near the upper end of the suspender element 4, while the lower ball-bearing element 7 is similarly clamped against an overhanging shoulder by means of the clamping ring 8. Both these ball-bearing elements sustain the radial thrust or pressure of the shaft and the upper one, in this case, sustains the axial or vertical thrust in both directions by reason of the fact that the anti-friction balls are seated in deep cut races.

The basket shaft 20 passes up through the tubular suspension element and has rigidly secured to its upper end a thrust head or cap 10, which rests upon the outer race of the bearing element 5, and to which is bolted an annular spider 11, having spaced claws or coupling fingers 11ª, as shown in Figure 2. This annular spider is provided with an internal annular drip trough 12 and abuts against the under side of the outer ball-race 5 so as to resist upward thrust of the basket shaft.

To guide the oil drip from the balls into the trough 12, I provide an annular drip member 5ª whose depending lip prevents the oil from running down between the outside of the suspender 4 and the adjacent inner wall of the trough 12, which is separated therefrom by a small annular clearance space.

The lower anti-friction bearing element 7 is intended to sustain the radial thrust only, and the shaft gets its radial bearing support through the medium of a spider or head 22 bolted to the flange 20ª of the shaft and extending up around the outside race of the ball-bearing element 7. A cover 23 serves to confine the oil within the interior of the head and is provided with an oil supply duct 23ª normally closed by a plug and having its inner end carried inside the walled-up body of oil when the machine is running.

A brake pulley 24 is secured to the head 22 by a flanged connection, and thus pulley 24 has the part surrounding the brake provided with annular circumferential heat-radiating ribs 25.

The vertically movable or thrust-transmitting socket member 2 is provided with an inwardly projecting annular lip 2ª which extends beyond the inner edge of the spherically curved seat and the spherically curved ball so as to catch any drip of the lubricant which is conveyed, through openings or outlets 2ᵇ, into the annular pocket or recess 1ᵇ formed on the inside of the fixed hanger 1. The ball 3 is provided with an outwardly projecting annular flange 3ª forming a drip wick to conduct any escaping lubricant that may overflow from the trough 12 into the trough 1ᵇ, formed inside the hanger 1.

The socket element 2 transmits the whole load of the centrifugal to the buffer 29 so that the weight compresses the buffer tightly between the surrounding casing or lower portion of the hanger and the interiorly disposed gyratory suspender 4. This arrangement of the buffer, some distance below the ball and socket suspension joint, serves to lessen the lifting tendency of the suspension element under the lateral sway of the basket, while the tight grip afforded by the heavily compressed buffer serves to overcome any lifting tendency that may be present. It will be observed that the buffer is pinned to the lower end of the socket element 2, as shown at 29ª, and that the buffer is also pinned to the interior gyratory suspender element 4, as shown at 29ᵇ. It, therefore, serves to prevent any tendency of the suspender element to rotate on its spherically curved bearing seat as it forms an intermediate rotation-preventing connection between these two members.

As shown, the basket-shaft is rotated by means of the non-gyratory overhead driving shaft 26 to which is secured a flanged collar 26ª to which is bolted a coupling spider 27, which has downwardly projecting arms extending to the level of the center of oscillation and, at that level, having engagement with the intermeshing arms 11ª of the coupling member secured to the upper end of the basket shaft. As shown in Figure 2, the opposed or engaging surfaces of these two interlocked coupling members are curved so as to permit the inner or driven member of the coupling to rock in all directions without transmitting lateral pressure to its companion or driving element of the coupling. This curvature permits a very close arrangement of the inter-engaging portions of the coupling elements and thus secures a positive driving connection with a minimum of lost motion or back-lash.

What I claim is:

1. In a suspended gyratory centrifugal, the combination with a non-rotating gyratory suspender supported on a non-gyratory support by a ball and socket joint, of an elastic centralizing buffer of compressible material located below said ball and socket joint and arranged to support the weight of the centrifugal and to be compressed thereby inwardly into tight gripping engagement with the suspender passing through it, to prevent it from lifting from its seat, under the stress of gyration, and a basket-carrying shaft rotatably supported on bearings carried by the gyratory suspender.

2. A suspended gyratory centrifugal embracing a non-rotating gyratory suspender suspended on a ball and socket joint, a rotary basket-carrying shaft extending through said suspender and having anti-friction rotary bearing support thereon, and an elastic centralizing buffer of compressible material arranged to support the weight of the centrifugal and prevent it from lifting from said joint under the stresses of gyration through its compressive grip around said suspender.

3. A suspended gyratory centrifugal embracing a non-gyratory support provided with a spherically curved socket, a gyratory suspender provided with a ball member adapted to seat in said socket for support, a rotary basket-shaft rotatably mounted in said suspender to gyrate therewith, an elastic centralizing buffer encircling said suspender and compressible thereon and forming an interlocking connection between the suspender and its support to positively prevent rotative movement of the suspender.

4. In a gyratory suspended centrifugal the combination with a fixed hanger, a socket member mounted therein to permit vertical movement, a gyratory suspension sleeve provided with a spherically curved suspension ball adapted to seat in said socket member to permit gyration, an elastic centralizing buffer interposed between the hanger and the gyratory suspension sleeve in position to support and be compressed by the downward thrust of said socket member, and a rotary basket-carrying shaft mounted inside the suspension sleeve and having bearing support thereon to permit rotation.

5. In a gyratory centrifugal, the combination of a rotary gyratory basket-shaft, a non-rotating tubular suspender supported on a ball and socket joint to gyrate about a center, axially spaced anti-friction bearing elements mounted around the outside of said suspender to support the axial and lateral thrusts of the basket-shaft, an overhead vertically aligned driving shaft, and positive drive coupling members secured to the adjacent ends of the two shafts and having rotatably interlocked driving engagement outside the tubular suspender around the center of gyration.

6. In a gyratory centrifugal, the combination of a rotary gyratory basket-shaft suspended in a non-rotating gyratory suspender to swing against yielding resistance upon a spherical bearing intermediate of its ends, an overhead non-gyratory driving shaft, a coupling member secured to the upper end of the basket shaft and extending downward to the plane of the centre of gyration, an outer coupling member secured to the driving shaft and extending down to said plane outside said suspender, each member having prongs interlocking with those of the other to afford positive and flexible driving connection without transmission of lateral stress between the shafts.

In witness whereof, I have subscribed the above specification.

EUGENE ROBERTS.